(12) United States Patent
Bell

(10) Patent No.: US 6,814,826 B1
(45) Date of Patent: Nov. 9, 2004

(54) USE OF WASTE CARPET AS BACKING FILLER FOR FLOOR COVERINGS

(75) Inventor: Michael E. Bell, Lexington, VA (US)

(73) Assignee: Mohawk Brands, Inc., Wilmington, DE (US)

(*) Notice: Subject to any disclaimer, the term of this patent is extended or adjusted under 35 U.S.C. 154(b) by 0 days.

(21) Appl. No.: 10/376,298

(22) Filed: Mar. 3, 2003

(51) Int. Cl.[7] .......................... B32B 27/30; B32B 27/36
(52) U.S. Cl. .......................... 156/94; 156/198; 156/332; 156/393
(58) Field of Search .......................... 156/94, 198, 332, 156/333

(56) References Cited

U.S. PATENT DOCUMENTS

| | | | |
|---|---|---|---|
| 4,582,554 A | * 4/1986 | Bell et al. | 156/247 |
| 4,737,221 A | * 4/1988 | Bell et al. | 156/231 |
| 5,169,870 A | 12/1992 | Corbin et al. | |
| 5,240,530 A | 8/1993 | Fink | |
| 5,288,349 A | 2/1994 | Fink | |
| 5,294,384 A | 3/1994 | David et al. | |
| 5,430,068 A | 7/1995 | Subramanian | |
| 5,497,949 A | 3/1996 | Sharer | |
| 5,498,667 A | 3/1996 | David et al. | |
| 5,518,188 A | 5/1996 | Sharer | |
| 5,547,731 A | 8/1996 | Tesch | |
| 5,578,357 A | 11/1996 | Fink | |
| 5,728,444 A | 3/1998 | Fink | |
| 5,728,741 A | 3/1998 | Zegler et al. | |
| 5,814,673 A | 9/1998 | Khait | |
| 5,855,981 A | 1/1999 | Zegler et al. | |
| 5,906,877 A | 5/1999 | Popper et al. | |
| 5,912,062 A | 6/1999 | Kotliar et al. | |
| 5,914,353 A | 6/1999 | Grizzle et al. | |
| 6,051,300 A | 4/2000 | Fink | |

FOREIGN PATENT DOCUMENTS

| | | |
|---|---|---|
| AT | 406 169 B | 3/2000 |
| EP | 0 747 525 A2 | 12/1996 |
| EP | 0 710 305 B1 | 5/1998 |
| EP | 0 867 557 A2 | 9/1998 |
| EP | 0 891 848 A2 | 1/1999 |
| EP | 0 943 728 A1 | 9/1999 |
| JP | 60206868 A | 10/1985 |
| JP | 63092765 | 4/1988 |
| WO | WO 99/40250 | 8/1999 |

* cited by examiner

Primary Examiner—Sephen J. Lechert, Jr.
(74) Attorney, Agent, or Firm—Nixon & Vanderhye

(57) ABSTRACT

The amount of waste carpeting that is landfilled or otherwise disposed of is significantly reduced, as is the need for the mining mineral fillers, by utilizing specially processed waste carpeting as a filler in the production of new hot melt carpet backcoating, roofing materials, or other similar products. Waste carpeting (post-consumer and/or waste from new carpet manufacture) is collected and size-reduced, typically in a first coarse size-reduction, and then after densification to a finer size-reduction. The size-reduced waste carpeting is added as filler to at least one other material, such as polymers in standard latex, EVA, or PVC carpet backcoatings, to provide a hot melt composite used in the manufacture of a useful product (like carpet backcoating), and then the composite material is used to make the useful product (such as carpet backcoating, which is used as a primary or secondary backcoating in the manufacture of new carpeting). The waste carpeting may provide between about 40–100% of the filler of carpet backcoating, with any remainder made up by conventional fillers, such as calcium carbonate.

17 Claims, 2 Drawing Sheets

USE OF WASTE CARPET AS BACKING FILLER FOR FLOOR COVERINGS

BACKGROUND OF THE INVENTION

In the conventional manufacture of floor coverings, e.g., carpeting and carpet tiles, hereafter sometimes collectively called carpeting, tufted pile yarns or like facings are held in place by a primary backing, and typically a secondary backing, as well as possibly other layers. At least some of the carpet backings (particularly latex, EVA, PVC, or other polymer-based backings) use filler as an important component thereof. The standard filler that is used is a mineral filler, typically calcium carbonate, alone, or in combination with some other common metal salts.

During the carpet manufacturing process there is waste carpeting produced, which is typically landfilled or burned. When new carpets are installed in place of old carpeting, the used, waste, carpeting (which is post-consumer waste at that point) is ripped up and also typically landfilled or burned. The calcium carbonate, or like mineral fillers, that are used in carpet backings are mined, and therefore have associated therewith the conventional problems associated with the mining of materials.

BRIEF DESCRIPTION OF THE INVENTION

According to the present invention methods of recycling waste carpeting and producing carpeting utilizing recycled materials, are provided which substantially eliminate or significantly reduce the problems discussed above. According to the present invention instead of using calcium carbonate, which is mined, as the filler for a carpet backing, recycled waste carpet (from new carpet production and/or from post-consumer waste) is used as the filler material in a hot melt application process in which the molten material including these waste products are applied to the carpet backing to deliver the desired physical properties such as strength and dimensional stability. This substantially eliminates, or at least significantly reduces, the amount of landfilling or other waste disposal that is necessary for waste carpeting while enabling the manufacture of fresh floor coverings using the waste materials.

The invention is also applicable to the production of other materials containing fillers, including various extruded thermoplastic and thermoset materials that typically use calcium carbonate filler, including, but not limited to, roofing materials, road paving materials, awnings, and tarps.

In a preferred embodiment according to the present invention, there is provided a method of manufacturing floor coverings using waste carpeting as at least part of backing material for the covering, comprising substantially sequentially the steps of (a) collecting waste carpeting, (b) effecting size reduction of the waste carpeting, (c) adding the size-reduced waste carpeting as a filler to at least one other material to form a molten mixture for backcoating a primary backing of the floor covering, (d) applying the molten mixture and a fabric material to a primary backing to form a laminate on the floor side of the primary backing and (e) cooling the laminate on the primary backing to form a floor covering having the backcoating containing the waste carpeting on a floor side of the primary backing.

In the method step a) may be practiced, to collect substantially only post-consumer waste carpeting, substantially only waste carpeting from new carpeting manufacture, or a blend of both. Post-consumer waste carpeting can be cleaned by any conventional cleaning technique before use, if desired or necessary. While the method is typically practiced utilizing all of the face yarn and primary backing, and backcoatings, under some circumstances the method may further comprise, between a) and b), separating the face yarn and primary backing from waste carpeting backcoating to produce a substantially face yarn and primary backing-free waste carpeting backcoating, and using substantially only the waste carpeting backcoating in step b). Also, various carpet backcoatings may be separated from each other so as to use only one particular carpet backcoating, such as the primary or secondary backcoating.

The invention may also further comprise, between steps b) and c), step f) densifying the size reduced carpeting, and effecting a further size-reducing thereof. Also step c) may be practiced so as to provide between approximately 40–100% of the filler of the carpet backcoating as size-reduced waste carpeting. For example in one embodiment of the invention, steps c) and d) are practiced to produce a carpet backcoating with about 5–18% EVA copolymer, about 32–45% resin, about 20–50% size-reduced waste carpeting filler, and about 0–30% calcium carbonate filler. Also in the practice of the method, steps b) and f) may be practiced to produce waste carpet coating have a particle size and range substantially the same as calcium carbonate filler.

The method includes latex carpet backcoatings and is not restricted to thermoplastic resin such as PVC carpet backcoatings, EVA, or other polymer-based backcoatings.

The invention also further typically comprises making new carpeting with the carpet backcoating.

Alternatively according to the present invention, steps c) and d) may be practiced to produce extruded thermoplastic or thermoset products and/or to produce awnings, roofing materials, road paving materials, or tarps, with a particle size of the waste carpeting filling between about 20–100 mesh.

According to another aspect of the present invention there is provided carpeting having a face and primary backing, primary backcoating, and at least one secondary backcoating; and at least one of the primary and secondary backcoatings comprising a polymer and filler, and wherein at least about 40% of the filler is size-reduced waste carpeting, at least one of the primary backcoating or secondary backcoating including a hot melt compound applied as a molten mixture of polymers and fillers. At least one of the backcoatings may comprise about 5–18% EVA copolymer, about 32–45% resin, about 20–50% size-reduced waste carpeting filler, and about 0–30% calcium carbonate filler. The size-reduced waste carpeting may comprise size-reduced post consumer waste carpeting, and the filler may have a particle size and range substantially the same as calcium carbonate filler.

It is the primary object of the present invention to produce new materials including floor coverings utilizing recycle waste carpeting to eliminate disposal problems, while at the same time reducing the mining or other production of filler materials typically used in carpet backing, or other products. These and other objects of the invention will become clear from an inspection of the detailed description of the invention and from the appended claims.

DETAILED DESCRIPTION OF THE INVENTION

Figure 1:
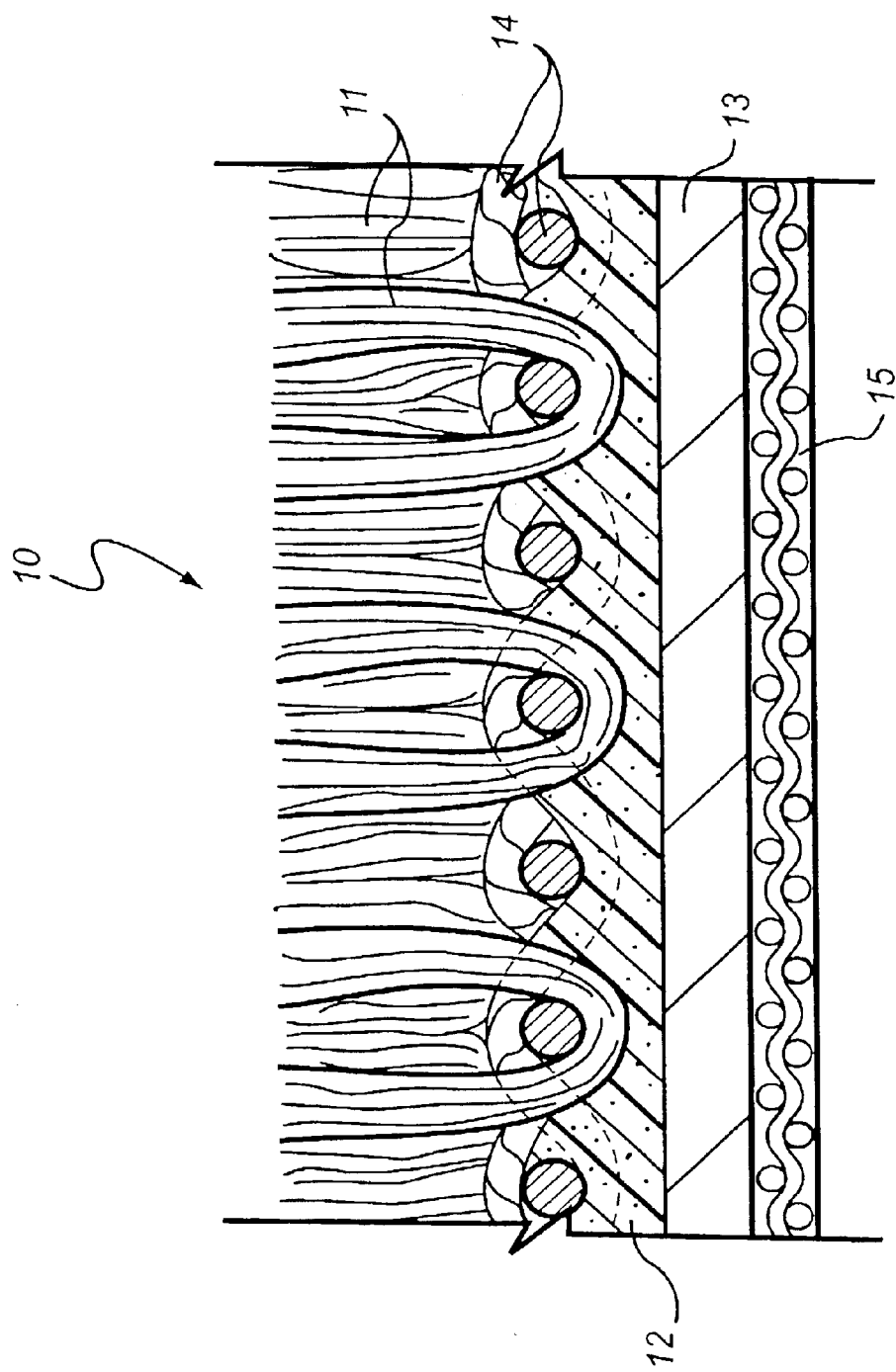
FIG. 1 is a schematic cross-sectional view of conventional carpeting, or carpeting produced according to the present invention.

A standard construction of carpeting is illustrated schematically by reference numeral 10 in FIG. 1. The carpeting includes face yarn 11, tufted into a woven or spun bonded fabric 14 known as a primary backing. The primary backing 14 has pile yarns 11 tufted therethrough extending outwardly from one face, a primary backcoating or precoat 12 on the opposite face, and at least one secondary backcoating or main coat 13. Other layers may also be associated with the carpeting 10. The primary backcoating or precoat 12 typically comprises latex, PVC, EVA, or other polymer-based material, and the secondary backcoating 13 may also comprise or include polymers in conjunction with a secondary backing material 15 such as a fabric woven from polypropylene yarns. Typically one or both of the primary backcoatings 12 and secondary backcoating(s) 13 include filler. The most common filler is mineral filler, typically calcium carbonate, although other fillers may be utilized, or calcium carbonate can be used with other common metal salts. According to the invention, new carpeting 10 may be produced with the filler of one or both of the primary backcoating 12 and secondary backcoating(s) 13 as size-reduced waste carpeting instead of calcium carbonate as all or part of the filler.

The carpeting 10 may also have any number of other layers, depending upon use. For example the carpeting 10 may have a conventional secondary backing (typically a woven or needle-punched fabric adapted to contact the floor or padding). Thus, the primary backcoating 12 may include a filler of size-reduced waste carpeting with one or more secondary backcoating 13 layers including or not filler of size-reduced waste carpeting. Preferably, however, the secondary backcoating 13 includes the filler of size-reduced waste carpeting in conjunction with a fabric material laminated to the primary backcoating 12.

Figure 2:
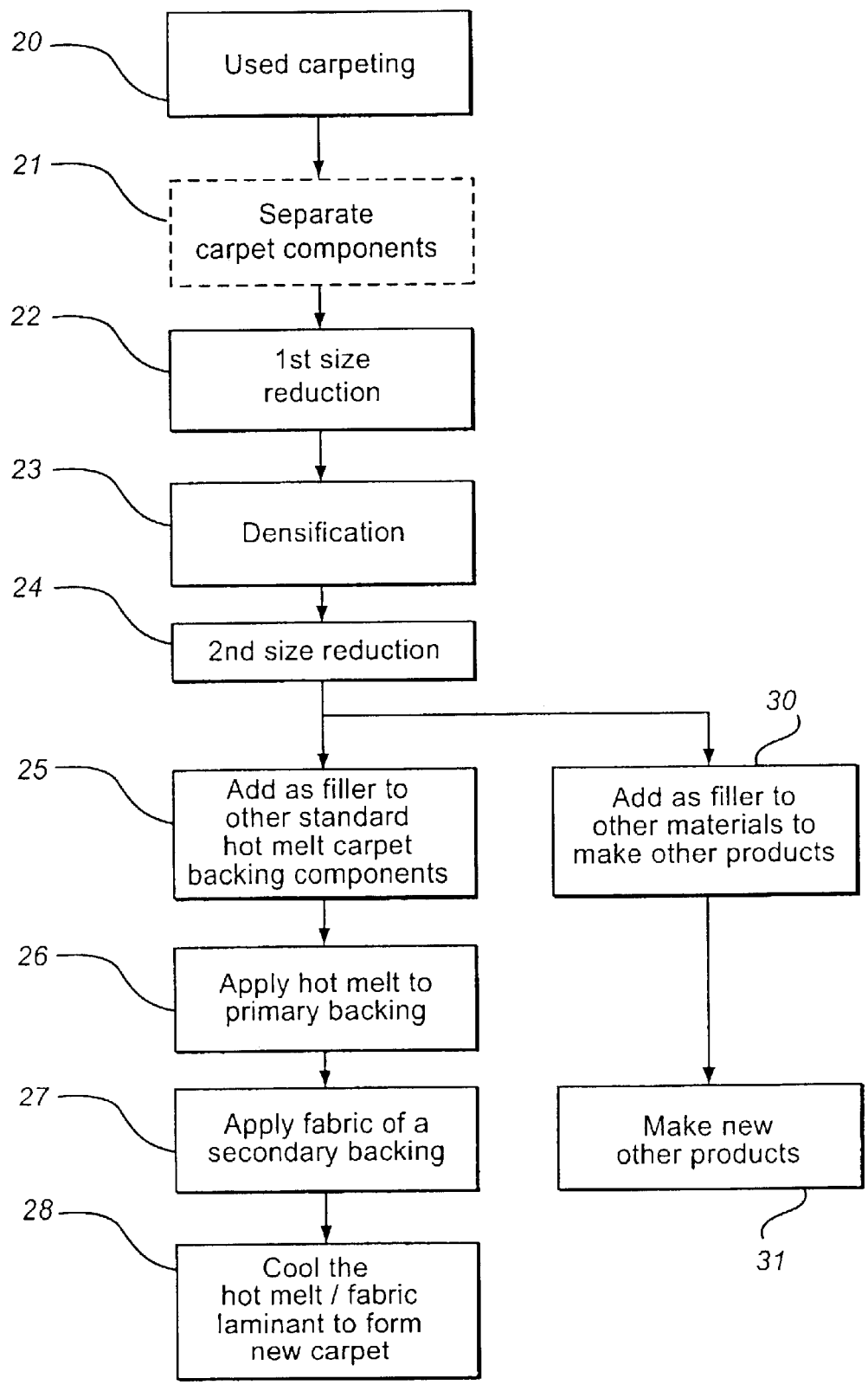
FIG. 2 is a block diagram illustrating various method steps that may be practiced according to the present invention.

FIG. 2 schematically illustrates an exemplary process according to the present invention. In the process, firstly used carpeting is initially collected as indicated at 20 in FIG. 2. The collection may comprise post-consumer waste carpeting collection, collection of waste carpeting from the standard procedures associated with the manufacture of new carpeting, or both. If the used carpeting collected at 20 is contaminated in any significant manner it may be cleaned using any suitable conventional technique (either before or, after size-reduction as hereinafter described).

It is contemplated that according to the present invention the waste carpeting that is subsequently employed in the manufacture of new carpeting utilizes substantially all components of waste carpeting, including the face yarns, primary backing, and primary and secondary backcoatings, and perhaps other components. However under some circumstances for either part or all of the waste carpeting it may be desirable to separate the face and primary backing and backcoatings from each other before further procedures. The optional separation of the carpet components is illustrated schematically at 21 in FIG. 2. The separation may be accomplished, depending upon whether the face and all backings and backcoatings are to be separated, utilizing any suitable conventional technique, such as generally described in U.S. Pat. No. 5,728,741 (the disclosure of which is hereby incorporated by reference herein) If only a certain backing or backcoating is used, an attempt may be made to match it with the manufacture of new backing or backcoating of substantially the same type (e.g. latex backcoating).

Whether or not procedure 21 is utilized, the waste carpeting is subjected to size-reduction. As illustrated at 22 in FIG. 2, the size reduction preferably comprises a first coarse size-reduction, which may be accomplished utilizing any suitable conventional chopping equipment, such as disclosed in U.S. Pat. Nos. 5,728,741 and 5,814,673.

While under some circumstances only the size-reduction 22 may be utilized, oftentimes it is necessary or desirable to effect densification and further size-reduction of the waste carpeting. Densification, as illustrated at 23 in FIG. 2, comprises increasing the density or specific gravity of the size-reduced waste carpeting from 22, to make it easier to handle the material during further processing. The size-reduced particles from 22 in FIG. 2 may be too large and fluffy to be handled easily, and may not blend sufficiently during subsequent processing. Therefore densification at 23 is desired. Densification at 23 may be practiced utilizing any suitable conventional technique, such as condux densification or use of a granulator, as described in U.S. Pat. No. 5,728,741.

Preferably after densification at 23, there is a second, finer, size-reduction of the waste carpeting, as indicated at 24 in FIG. 2. In many circumstances the second size-reduction at 24 is practiced so as to produce waste carpeting having a particle size and range that is substantially the same as calcium carbonate filler, e.g. in the range of about 200–325 mesh, nominally. The second size reduction at 24 may be practiced using techniques that are conventional per se, such as pulverizing or acting upon with roller mills.

In the preferred procedure according to the present invention, the size-reduced waste carpeting from 20 through 24 is used as a filler with other standard carpet backcoating components, either for primary backcoating, or a secondary backcoating, or other backing elements of carpeting (typically collectively referred to as main coats). For example latex, EVA, or PVC backcoatings of conventional construction are particularly suitable for utilization of the waste carpeting filler from 20 through 24 in FIG. 2. The waste carpeting can be used as substantially the only filler, or can replace a significant amount of the filler that is utilized.

While a wide variety of polymers or other materials may be used to produce the carpet backcoatings according to the present invention, one exemplary carpet backcoating will be described below. A standard hot melt backcoating such as the Lees Unibond™ backcoating system may contain, for example [all percentages given herein are by weight unless other indicated]:

a. 5–18% EVA copolymer
 b. 32–45% resin, such as ECR-171 from Exxon
 c. 50% calcium carbonate filler, JR-78.

According to the invention, instead of using all calcium carbonate as the filler, a significant amount of the calcium carbonate usually added to the molten resin and copolymer can be replaced by the size-reduced waste carpeting according to procedures 20 through 24 of FIG. 2. For example, between about 40–100% of the filler of the carpet backcoating (e.g., precoat 12 or secondary backcoating 13) may be size-reduced waste carpeting. In the above example, then, about 20–50% of the carpet backcoating may be size-reduced waste carpeting filler, and about 0–30% calcium carbonate filler, e.g. about 25% each of size-reduced waste carpeting (about 200–325 mesh, nominally) and calcium carbonate as fillers.

The waste carpeting filler according to the present invention is mixed with the other component(s) using standard hot melt mixing equipment and techniques as indicated at 25. In a preferred embodiment as indicated in FIG. 2 at 26, the hot molten mixture of polymer, resin and size-reduced waste carpet is applied to the primary backing or backcoating. A secondary backing material, such as a woven, felt or needle-punched fabric material, is also applied to the hot molten mixture, as indicated at 27, which, together with the application of molten mixture indicated at 26 containing the waste carpeting filler, form a laminate on the floor side of the primary backing. The molten mixture is applied to the backside of the primary backing in hot melt form by applicator rolls to form with the fabric material one or the other or both of the backcoatings on the floor side of the primary backing as indicated at 27. The backcoating is then cooled, as indicated at 28 in FIG. 2, again using conventional techniques. Additional backcoating from 26 may be applied to make the new carpet, again by conventional techniques. The backing from 27 may be used as the primary backcoating (12); or a secondary backcoating (13) of the carpeting with or without but preferably with the fabric material; or as a filler in all of the backcoatings. It will be appreciated that the latex-backed waste carpet may also be used in the foregoing process in lieu of thermoplastic or thermoset materials.

While the preferred embodiment of the invention is the utilization of waste carpeting in new carpet manufacture, other uses are also possible. For example as illustrated schematically at 30 in FIG. 2, size-reduced waste carpeting from 20–24 may be added as a filler to other materials to make other useful products, such as extruded thermoplastic and thermoset materials that typically use calcium carbonate or other mineral fillers. Again the waste carpeting used at 30 may be substituted for part or substantially all of the calcium carbonate conventional filler. A number of other products that may be made comprise almost all products that typically can use calcium carbonate (or its equivalents) as the filler, and some of the new products that can be made—as illustrated schematically at 31 in FIG. 2 include roofing materials, awnings, road surfacing materials, and tarps, all of which contain mineral fillers. For these applications, particle size may not need to be as small as for carpet backcoatings, e.g. between about 20–100 mesh.

During any of the procedures described above various conventional refinements may be employed. For example screening or other contaminant removal may be practiced where desired, as can be testing, sampling, or any other suitable techniques that are necessary or desirable in order to produce a product with desired properties.

It will thus be seen that by practicing the present invention it is possible to substantially eliminate or significantly reduce landfilling or other disposal of waste carpeting, and at the same time to reduce the mining of mineral fillers, without sacrificing new product quality, by using processed waste carpeting as a filler for new carpet backcoatings, roofing materials, or in other situations.

While the invention has been described in connection with what is presently considered, to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing floor coverings using waste carpeting as at least part of backing material for the covering, comprising substantially sequentially the steps of:
    a) collecting waste carpeting;
    b) effecting size reduction of the waste carpeting;
    c) adding the size-reduced waste carpeting as a filler to at least one other material to form a molten mixture for backcoating a primary backing of the floor covering;
    d) applying the molten mixture and a fabric material to a primary backing to form a laminate on the floor side of the primary backing; and
    e) cooling the laminate on the primary backing to form a floor covering having the backcoating containing the waste carpeting on a floor side of the primary backing.

2. A method as recited in claim 1 further comprising, between steps b) and c), step f) densifying the size-reduced carpeting, and effecting a further size-reduction thereof.

3. A method as recited in claim 2 wherein step c) is practiced by adding the size-reduced waste carpeting to at least two other materials including, EVA and a tackifier resin; and step d) includes applying the molten mixture to the primary backing using applicator rolls.

4. A method as recited in claim 3 wherein step c) is practiced so as to provide between approximately 40–100% of the filler of the floor covering backcoating as size-reduced waste carpeting.

5. A method as recited in claim 4 wherein steps c) and d) are practiced to produce a hot melt floor covering backcoating with about 5–18% EVA copolymer, about 32–45% resin, about 20–50% size-reduced waste carpeting filler, and about 0–30% calcium carbonate filler.

6. A method as recited in claim 1 wherein steps c) and d) are practiced to produce extruded thermoplastic or thermoset products.

7. A method as recited in claim 1 wherein step a) includes collecting latex-backed waste carpet and step c) includes adding the reduced latex-backed waste carpet to form the molten mixture.

8. A method as recited in claim 1 wherein steps c), d) and e) are practiced to produce a latex, EVA, or PVC floor covering backcoating.

9. A method as recited in claim 1 further comprising, between steps a) and b), separating the face yarn and primary backing from waste carpeting to produce a substantially face yarn and primary backing-free waste carpeting backcoating, and using substantially only the waste carpeting backcoating in step b) and succeeding steps.

10. A method as recited in claim 2 wherein steps b) and f) are practiced to produce waste carpeting have a particle size and range of about 200–325 mesh, nominally.

11. A method as recited in claim 1 wherein step a) is practiced to collect substantially only post-consumer waste carpeting.

12. A method as recited in claim 1 wherein steps c), d) and e) are practiced to produce a primary floor covering backcoating.

13. A method as recited in claim 7 further comprising, between steps b) and c) step f) densifying the size-reduced carpeting, and effecting a further size-reduction thereof.

14. A method as recited in claim 8 further comprising, between steps b) and c), step f) densifying the size-reduced carpeting, and effecting a further size-reduction thereof.

15. A method as recited in claim 9 further comprising, between steps b) and c), step f) densifying the size-reduced carpeting, and effecting a further size-reduction thereof.

16. A method as recited in claim 3 wherein steps b) and f) are practiced to produce waste the floor covering having a particle size and range of about 200–325 mesh, nominally.

17. A method of manufacturing floor coverings using waste carpeting as at least part of backing material for the covering, comprising substantially sequentially the steps of:
    a) collecting waste carpeting;
    b) effecting size reduction of the waste carpeting;
    c) adding the size-reduced waste carpeting as a filler to at least one other material to form a molten mixture for backcoating a primary backing of the floor covering;

d) applying a coating of the molten mixture and a fabric material to a primary backing to form a laminate on the floor side of the primary backing;

e) marrying a woven, felt or needle-punched secondary backing to the coated primary backing; and f) cooling the laminate on the primary backing to form a floor covering having the backcoating containing the waste carpeting on a floor side of the floor covering.

* * * * *